United States Patent Office 3,519,656
Patented July 7, 1970

3,519,656
ANTHRAQUINONE DYESTUFFS
Hans Rudolf Schwander, Riehen, Switzerland, assignor to J. R. Geigy A.G., Basel, Switzerland
No Drawing. Continuation-in-part of application Ser. No. 462,410, June 8, 1965. This application Mar. 7, 1967, Ser. No. 621,125
Int. Cl. C09b *1/42, 1/52*
U.S. Cl. 260—372
20 Claims

ABSTRACT OF THE DISCLOSURE 1,4-diamino-6- and/or 7-unsubstituted or halogen-substituted anthraquinone dyes the amino groups of which are substituted in 1- and 4-position by benzoylamino-methyl-phenyl and tetrahydronaphthyl radicals and/or in 2- or 2- and 3-position by benzoylaminomethyl-phenoxy radicals which substituents are free from sulphonic acid groups or are substituted by two of the latter groups; these dyestuffs are useful for the dyeing and printing of fibres containing polypeptide groups, e.g. wool, leather, silk, superpolyamide and superpolyurethane fibres from an acid aqueous bath, the dyes drawing very evenly on these fibres, in particular on wool, and affording dyeing of good fastness especially to washing, milling and alkaline media, or, unsulphonated, as disperse dyes.

CROSS REFERENCES TO RELATED APPLICATIONS

This is a continuation-in-part application of application Ser. No. 462,410, filed June 8, 1965, now U.S. Pat. 3,320,287, which application in turn is a continuation-in-part of my application Ser. No. 44,528, filed July 22, 1960 and now abandoned.

SUMMARY OF THE INVENTION

The present invention concerns new anthraquinone dyestuffs, processes for the production thereof and their use for the dyeing and printing of fibres containing polypeptide groups. The invention also concerns the industrial products produced by the use of these new dyestuffs.

It has been found that valuable new anthraquinone dyestuffs are obtained of the formula

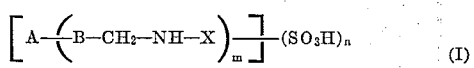

$$\left[ A \!-\! \left(\!B\!-\!CH_2\!-\!NH\!-\!X\right)_m\right] \!-\! (SO_3H)_n \quad (I)$$

wherein

A represents an m-valent radical of an anthraquinone dyestuff,
B represents a divalent aromatic radical bound to the anthraquinone nucleus by a hetero atom from the group of N, O and S atoms,
X represents the acyl radical of an aromatic monocarboxylic acid, and
$m$ and $n$ represent low whole numbers, if an anthraquinone compound, which contains at least one aromatic radical bound to the anthraquinone nucleus by way of a hetero atom from the group of N, O and S atoms and which has at least one replaceable hydrogen atom in the nucleus of the said aromatic radical, is treated with the N-methylol compound of an aromatic monocarboxylic acid amide or with a functional derivative thereof which reacts like this methylol compound until at least one X—NH—CH$_2$— radical is introduced and the reaction product, if necessary, is sulphonated.

The new anthraquinone dyestuffs can also contain more aroylamidomethyl groups as defined. This is the case, for example, on using starting products in which the anthraquinone nucleus is substituted by further condensable aromatic radicals. However, more of such aroylamidomethyl groups can be bound to a single substituent if the latter is only mononuclear; they can also be bound to a single nucleus. The number of such groups which are characteristic of the new dyestuffs which are introduced into the anthraquinone compound on reaction with the methylol compound depends in the first place on the nature of the aromatic radicals bound at the anthraquinone nucleus. However, in many cases by the choice of suitable reaction conditions, the number of aroylamidomethyl groups to be introduced can also be influenced or even determined. It is thus often possible to introduce the number of such groups which is most favourable for the properties of the end products. Anthraquinone compounds according to the invention having one aroylamidomethyl group per aromatic radical are particularly valuable dyestuffs.

The new anthraquinone dyestuffs which are useful as polyamide dyes contain at least one sulphonic acid group. This water solubilising substituent is already present advantageously in the anthraquinone compound used as reaction component. However, this group or other such groups can often be introduced in a simple manner either during or after the condensation reaction by sulphonation. In general, the presence of more than three sulphonic acid groups in the end product is not desirable.

The anthraquinone compounds used in the present process as starting products which contain at least one aromatic radical bound to the anthraquinone nucleus by a nitrogen, oxygen or sulphor atom should be of the series of the simple anthraquinonyl compounds. As such are utilised in particular the anthraquinonyl-α,α'-diamino, α-aminoanthraquinonyl-α'-imino, α,α' - diaminoanthraquinonyl-β-oxy and α,α' - diaminoanthraquinonyl-β,β'-dioxy compounds. Particularly easily accessible and therefore preferred starting products used according to the invention are, for example, 1 - amino-2-sulphoanthraquinonyl-4-aminoaryl-, 1-amino- or 1-alkylamino-anthraquinonyl-4-aminoaryl, anthraquinonyl - 1,4- or 1,5-diaminoaryl, 1,4-diaminoanthraquinonyl - 2 - oxyaryl or -2-thioaryl or -2,3-dioxyaryl or -2,3-dithioaryl and 1-amino-4-arylaminoanthraquinonyl-2-oxyaryl compounds. The anthraquinone nuclei themselves can also be still further substituted, for example, by halogen, particularly by chlorine or bromine, and also by methyl, hydroxyl and sulphonic acid groups.

Advantageously the aromatic radicals bound to the anthraquinone nuclei by N, O or S atoms are of the isocyclic series. Particularly, they are radicals of the benzene series, thus, for example, phenyl, diphenyl, styryl, diphenylether, diphenylthioether, diphenylamine, benzoylaminophenyl and benzylphenyl radicals. The aromatic radicals can contain the substituents usual in anthraquinone dyestuffs, thus, chiefly alykl groups such as, e.g. methyl, ethyl, propyl, butyl and amyl groups; or cycloalkyl groups such as, e.g. the cycohexyl group; then halogens such as chlorine, bromine and fluorine; also alkoxy groups such as, e.g. methoxy, ethoxy and butoxy groups; then also nitro, acid amide, acid ester, sulphonic acid, alkylsulphonyl, alkylamino and acylamino groups. The condition is that the arylamino or aryloxy or arylthio groups in the aryl radical contain at least one replaceable hydrogen atom in order to be able to react with the other reaction component, i.e. with the N-methylol compound of the aryl carboxylic acid amide. The more nucleophilic the aryl radical is under the reaction conditions, the easier is the condensation with the methylol compound. Good yields and uniform condensation products are thus obtained principally with those anthraquinone compounds which contain only nucleophilically substituted arylamino or aryloxy or arylthio groups.

From the aforesaid it can be seen that the anthraquinone compounds used as starting products, the aryl substituents should, if possible, be of the benzene series; in addition they should be bound advantageously by way of an imino group at an α-position of the anthraquinone nucleus and should be substituted, advantageously, only by nucleophilic groups.

The aroyl-N-methlolamides used as second reaction component in the process according to the invention are obtained by adding formaldehyde to the corresponding aromatic monocarboxylic acid amides in the presence of basic condensing agents such as, e.g. potassium carbonate, or in the presence of mineral acid also, in this case under mild conditions. Advantageously the known and easily accessible primary amides of mono- or poly-nuclear monocarboxylic acids, e.g. those of the benzene, naphthalene, diphenyl, diphenylether, diphenylamine and diphenylketone monocarboxylic acids are used as aromatic monocarboxylic acid amides. Also mixtures of carboxylic acid amides can be used, for example, the amides of mixtures of aromatic monocarboxylic acids obtained by oxidising a mixture of benzene homologues or a mixture of halogenated toluenes or also those obtained by chlorinating benzoyl chloride. However, in the present process chiefly the N-methylol compounds of benzene monocarboxylic acid amides are used. The benzene nuclei can contain the substituents usual in anthraquinone dyestuffs, in particular those mentioned above. N-methylolbenzamide and its halogenated, in particular chlorinated, derivatives are the preferred reaction components both in view of their easier accessibility and also in view of the good dyeing properties of the end products obtained therefrom.

The anthraquinone compounds are condensed with the methylol compounds in the presence of acid condensing agents or of agents which split off water and react like acid condensing agents. As such, principally concentrated hydrochloric acid, zinc chloride, phosphorus pentoxide, acetic acid anhydride, viscous phosphoric acid and oleum are used. However, the preferred condensing agent is concentrated or anhydrous sulphuric acid as generally it can serve simultaneously as solvent for the reaction components. The reaction temperature can vary between wide limits and depends chiefly on the condensing agent used. In concentrated sulphuric acid the reaction generally proceeds quickly and completely at room temperature. In some cases, a raised temperature is necessary, for example 40–80°, particularly when a number of aroylamidomethyl groups are to be introduced. This, however, is under the proviso that the reaction components are not decomposed under these conditions and that a possible sulphonation of the reaction product is not undesirable. The final reaction products are precipitated by pouring the sulphuric acid solutions or suspensions into ice water and then isolating in the usual way.

Instead of the aryl carboxylic acid-N-methylolamides, also reactive functional derivatives of these methylol compounds can be used provided they react in the same way. For example, the esters obtained by treating the methylol compounds with inorganic or organic acids or acid halides or anhydrides, or also the di-(aroylamidomethyl)-ethers obtained by self-condensation in the presence of, e.g. phosphorus oxychloride can be used. However, as these functional derivatives have generally to be produced from the corresponding methylol compounds, the first process is altogether preferred. It is possible, though, in single cases in which unsatisfactory results are obtained with the methylol compounds, to attain the goal with these derivatives, particularly with the N-chloromethylamides. In some cases, the process according to the invention can be simplified with good results by reacting in one vessel a mixture of the dyestuff with formaldehyde or a polymer thereof and with the aroylamide instead of starting with the completely formed methylol compounds of the amides.

A modified process for the production of dyestuffs according to the invention consists in forming the anthraquinone compounds from components of which at least one already contains at least one aroylamidomethyl group of the formula X—NH—CH$_2$. This is done by reacting an anthraquinone compound and an aromatic compound each of which contains a reactive substituent, in which reaction the components are condensed. The aromatic compound used in this reaction is one which already contains at least one aroylamidomethyl group.

Reactive substituents which react while condensing are, for example, on the one hand the amino and hydroxyl groups and on the other, for example the carboxylic acid or sulphonic acid halide groups or mobile, nuclearly bound halogen. For example, 1-amino-4-bromoanthraquinone-2-sulphonic acid is condensed by methods known per se with an arylamine to form 1-amino-4-arylaminoanthraquinone-2-sulphonic acid, choosing as arylamine an aromatic amine which already contains at least one benzene monocarboxylic acid amidomethyl group which is possibly further substituted in the benzene nucleus.

The possibility of introducing further sulphonic acid groups into the reaction products after the amidomethylation has already been referred to above. It is also possible, however, to introduce other substituents into the amidomethylation products subsequently; in particular they can be subsequently brominated.

The anthraquinone dyestuffs produced according to the invention, in particular those which contain not more than two acid water solubilising groups, are suitable for the dyeing and printing of fibres containing polypeptide groups such as, e.g. leather, silk, superpolyamide and superpolyurethane fibres and, in particular, wool. From an acid aqueous bath, the dyestuffs draw very evenly onto these materials. Even in weakly acid to neutral solution, many of them have a high affinity to the nitrogenous fibres mentioned and thus have very good drawing power. The dyeings so obtained, in particular the wool dyeings, are very level and wet fast, e.g., they have good fastness to washing and milling, also in an alkaline medium. In addition, the dyeings often have very good fastness to light.

Particularly valuable, principally in view of their shades and very good fastness properties, are those dyestuffs according to the invention which correspond to the general formula

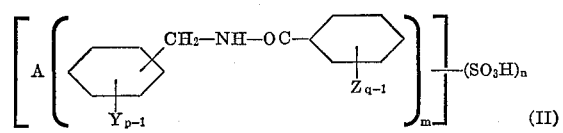

(II)

wherein

A represents a member selected from the group consisting of anthraquinonyl-α,α′ - di - imino, α,α′-diaminoanthraquinonyl-β,β′-dioxy and α-aminoanthraquinonyl-α′-imino-β-oxy radicals, each radical

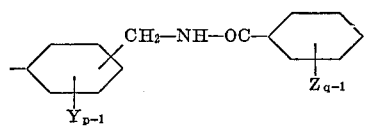

being attached to imino-N or oxy-O atoms of A,

Y represents a member selected from the group consisting of chlorine, bromine, lower alkyl and tetramethylene radicals, Z represents a member selected from the group consisting of chlorine and bromine, $m$ means a positive whole number of at most 2, $n$ means a positive whole number of at most 3, $p$ means a positive whole number of at most 4, and $q$ means a positive whole number of at most 4.

Of these dyestuffs, those are preferred which are derived from 1,4-diaminoanthraquinone.

The unsulphonated dyestuffs according to the invention are useful as disperse polyester dyes.

Preferred subclasses of dyes falling under Formula II are (a) Those dyestuffs which are mixtures of the isomers falling under Formulas III and IIIA:

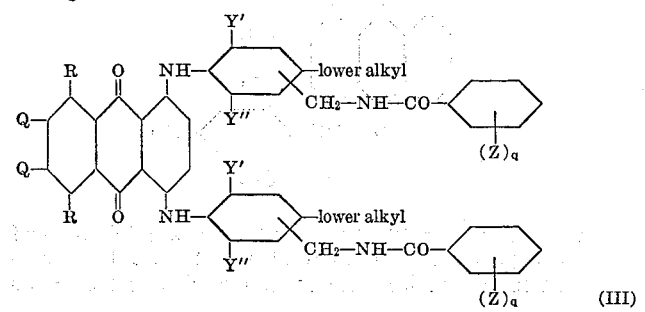

(III)

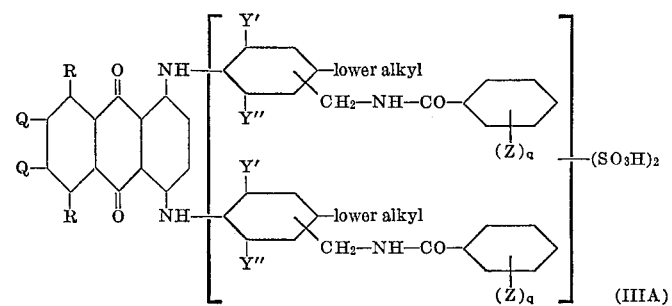

(IIIA)

in which Formulas III and IIIA

R represents hydrogen or hydroxyl, but preferably the former,

Q represents hydrogen, chlorine or bromine, but preferably hydrogen or chlorine, Z represents hydrogen, lower alkyl, chlorine, bromine or nitro, $q$ is an integer ranging from 1 to 2, Y' represents hydrogen or lower alkyl, and Y'' represents hydrogen, lower alkyl, bromine or chlorine, the —SO$_3$H groups present being bonded to ring carbon atoms;

(b) Those of Formulas IV and IVA:

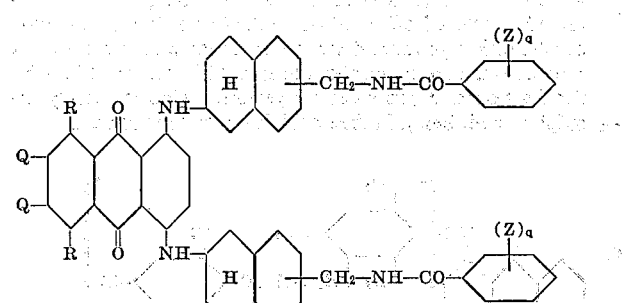

(IV)

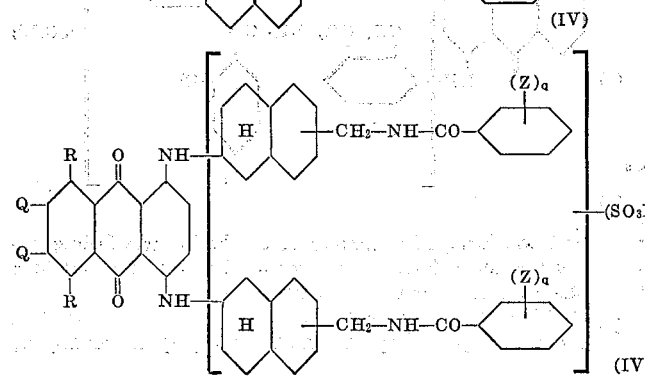

(IVA)

in which Formulas IV and IVA, R, Q, Z and $q$ have the same meanings as in preceding Formulas III and IIIA; and

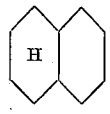

stand for tetrahydronaphthyl;

(c) Those dyestuffs which are mixtures of the isomers falling under the Formulas V and VA:

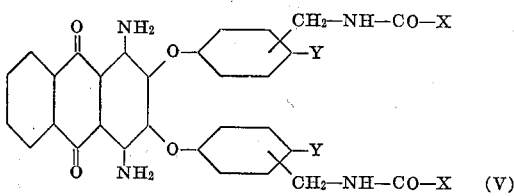

(V)

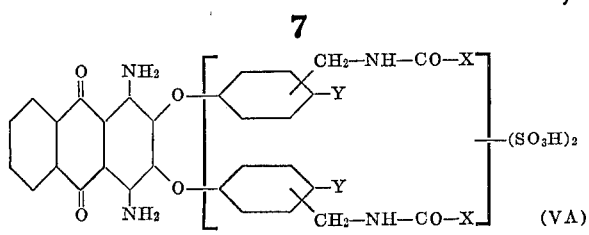

in which Formulas V and VA

Y represents hydrogen or lower alkyl, and

X represents unsubstituted phenyl, or phenyl substituted by preferably not more than 3 substituents selected from the following: lower alkyl, bromine, chlorine or nitro; X being preferably phenyl or lower alkylphenyl, bromophenyl or chlorophenyl, the —SO$_3$H groups present being bonded to ring carbon atoms;

and, finally, (d) Those dyestuffs which are mixtures of the isomers falling under Formulas VI and VIA:

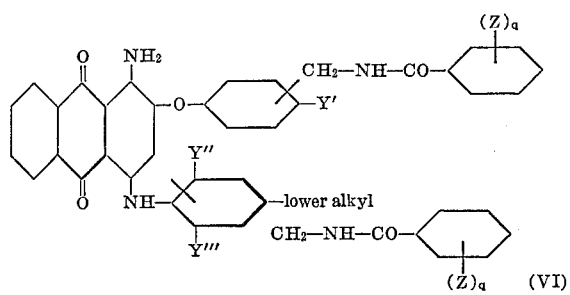

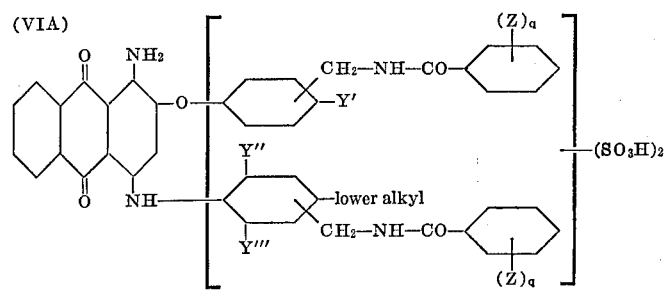

in which formulas Y' and Y'' have the same meanings as in Formulas III and IIIA, Y''' represents hydrogen or lower alkyl, but preferably it represents methyl; "lower alkyl" in these formulas represents preferably methyl, and Z and q have the same meanings as in Formulas III and IIIA, but preferably the radicals

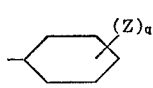

represent the groups

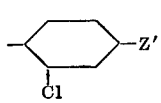

wherein Z' is hydrogen or chlorine, the —SO$_3$H groups present being bonded to ring carbon atoms.

The invention is further illustrated by the following non-limitative examples. Where not otherwise stated, part and percentages are given therein by weight and the relationship of parts by weight of parts by volume is as that of grams to milliliters. The temperatures are in degrees Centigrade.

EXAMPLE 1

14.22 parts of the condensation product of 1 mol of quinizarine or leucoquinizarine and 2 mols of 1-amino-2, 4,6-trimethylbenzene, corresponding to the formula

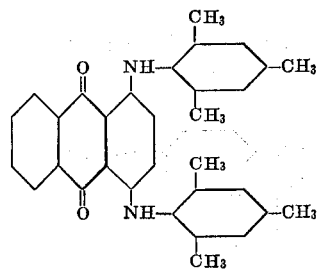

are dissolved at 10–15° in 150 parts of sulphuric acid monohydrate and 14 parts of N-methylol-2,4-dichlorobenzamide are added. The mixture is stirred for 24 hours at 10–15° and then poured onto ice. The precipitate obtained is filtered off, washed neutral and dried. This blue condensation product dissolves in organic solvents with a blue colour and on sulphonating in 10% oleum at 15–18° for 24 hours, it produces a dyestuff, which is mainly disulphonated, being in free acid form of the formula and consisting of a mixture of all the isomers falling under the above formula. It dyes wool in very wet-fast blue shades from a weakly acid bath.

While it is possible to isolate the isomers constituting the above dyestuff by known chromatographic techniques, and to identify the position of the fiber-reactive Einhorn groups and of the sulfonic acid groups in each isomer from its magneto-nuclear resonance spectrum, such further workup will not lead to products of improved properties, and is, moreover, highly uneconomical, so that it is of no practical value.

If, instead of the chlorinated methylol compound, 15.2 parts of N-methylol-o-bromobenzamide or 20.5 parts of N-methylol - 2,4 - dibromobenzamide or 9.5 parts of N-methylol-benzamide or 11.3 parts of N-methylol-2,4- or -3,4-dimethyl benzamide are used under otherwise the same conditions, then dyestuffs having similar properties are obtained.

N - methylol-o-bromobenzamide, N-methylol - 2,4 - dibromobenzamide and N-methylol-2,4- or -3,4-dimethyl benzamide are obtained by reacting the corresponding benzamides with formaldehyde in alkaline, aqueous/alcoholic solution.

EXAMPLE 2

16.25 parts of the condensation product of 1 mol of 6,7-dichloroquinizarine and 2 mols of 1-amino-2,4,6-trimethylbenzene which corresponds to the formula

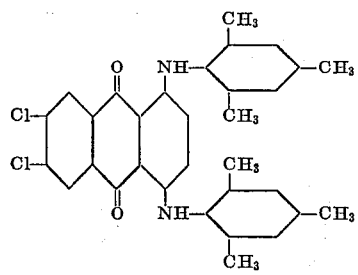

are dissolved at 10–15° in 170 parts of sulphuric acid monohydrate and 14 parts of N-methylol-2,4-dichlorobenzamide are added. The solution is stirred for 24 hours at 10–15° and then poured onto ice. The condensation product which precipitates is then filtered off, washed neutral and dried. On sulphonating in 10% oleum for 24 hours at 18–20° a dyestuff of the formula

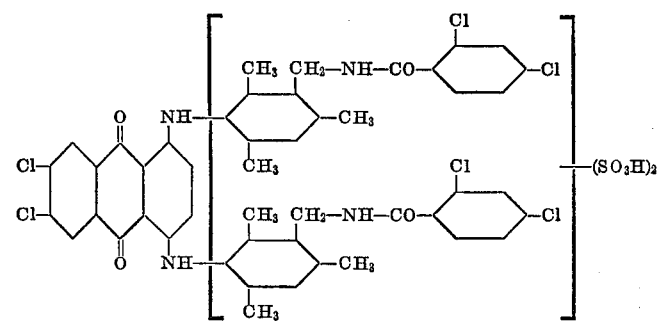

consisting of a mixture of all the isomers falling under the above formula isobtained when dyes wool from a weakly acid to neutral bath a greenish blue shade. The dyeings have good wet and light fastness properties.

If, under otherwise the same conditions, instead of the dyestuff mentioned above, 15.25 parts of the condensation product of 1 mol of 6-chloroquinizarine and 2 mols of 1-amino-2,4,6-trimethylbenzene or 16.6 parts of the condensation product of 1 mol of 6-bromoquinizarine and 2 mols of 1-amino-2,4,6-trimethylbenzene are used, then dyestuffs which also dye wool a very fast blue shade are obtained.

If, in these condensations, under otherwise the same conditions, 9.5 parts of N-methylol-benzamide, or 11.7 parts of N-methylol-2-chlorobenzamide are used instead of N-methylol dichlorobenzamide, then dyestuffs having similar properties are obtained.

EXAMPLE 3

18.1 parts of the dye base of the formula

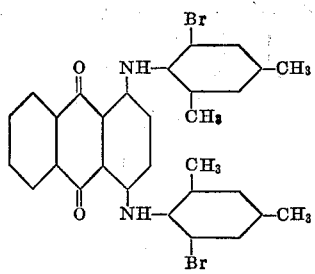

are dissolved at 10–15° in 180 parts of sulphuric acid monohydrate and 11.7 parts of N-methylol-2-chlorobenzamide are added. The mixture is stirred for 24 hours at 10–15°, then poured onto ice, the product which precipitates is filtered off, washed neutral and dried. After sulphonating for 2 hours at 10–12° in 33% oleum, a dyestuff which consists of a mixture of all the isomers falling under the formula

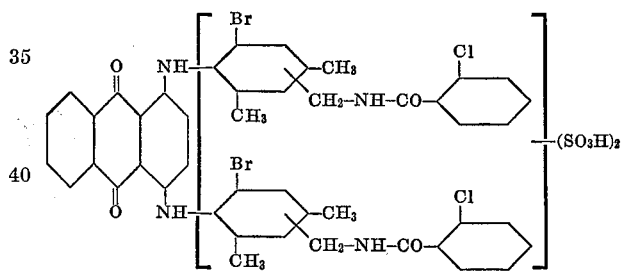

is obtained from the condensation product.

It dyes wool a reddish blue shade from a weakly acid to neutral bath and the dyeings have very good wet fastness properties.

If, instead of N-methylol-2-chlorobenzamide, 14 parts of N-methylol-2,4 - dichlorobenzamide or 14 parts of N-methylol dichlorobenzamide (obtained from a technical dichlorobenzoic acid by chlorinating and oxidizing toluene, consisting apart from trichlorobenzoic acid mainly of 2,4- or 2,6-dichlorobenzoic acid) are used under otherwise the same procedure, then a dyestuff having similar properties is obtained.

EXAMPLE 4

15.4 parts of the dye base of the formula

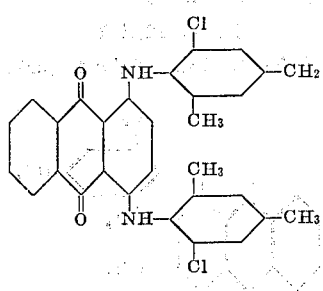

are dissolved in 160 parts of sulphuric acid monohydrate at 10–15° and 14 parts of N-methylol-2,4-dichlorobenzamide are added. The mixture is stirred for 24 hours at 10–15°, then poured onto ice and the product which precipitates is filtered off, washed neutral and dried. On sulphonating the condensation product in 33%

EXAMPLE 5

9.96 parts of the condensation product of 1 mol of quinizarine and 2 mols of 1,2,3,4-tetrahydro-2-naphthylamine, which corresponds to the formula are mixed with 9.2 parts of N-methylol-2,4-dichlorobenzamide and the mixture is added at 0–5° to 100 parts of 96% sulphuric acid. The mixture is stirred for 24 hours at 5°, then poured onto ice and the precipitated product is filtered off, washed neutral and dried. After sulphonating the condensation product in 10% oleum for 24 hours at 15–18°, a dyestuff consisting of a mixture of all isomers falling under the formula

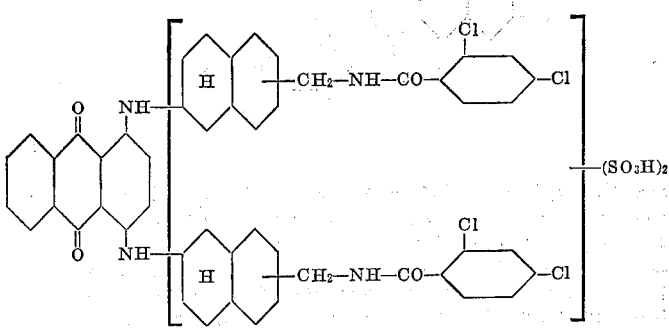

oleum for 2 hours at 10–12°, a dyestuff consisting of a mixture of all the isomers falling under the formula

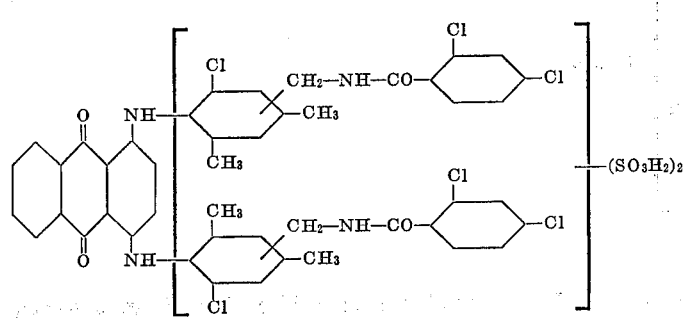

is obtained which produces wet-fast, reddish blue dyeings on wool from a weakly acid bath.

If, under otherwise the same conditions, 11.7 parts of N-methylol-2-chlorobenzamide are used instead of N-methyl-2,4-dichlorobenzamide, then a dyestuff which has similar properties is obtained.

is obtained which dyes wool blue from a weakly acid bath. The dyeings are wet-fast.

If, under otherwise the same conditions, the number of parts of dye bases given in the following Table 1 are used instead of the 9.96 parts of the above condensation product, then dyestuffs which have similar good properties are obtained.

TABLE 1

| Ex. No. | Parts | Dye base | Shade on wool |
|---|---|---|---|
| 6 | 11.54 | | Blue. |
| 7 | 11.32 | | Greenish blue. |
| 8 | 10.28 | | Do. |
| 9 | 10.60 | | Blue green. |

Similar good wool dyes are obtained when repeating Examples 5 to 9, but replacing 9.2 parts of N-methylol-2,4-dichlorobenzamide used therein by 6.25 parts of N-methylol-benzamide or 10 parts of N-methylol-o-bromo-benzamide or 13.5 parts of N-methylol-2,4-dibromobenzamide or 8.6 parts of N-methylol-4-ter.butyl-benzamide or 8.2 parts of N-methylol-4-nitro-benzamide, respectively.

EXAMPLE 10

12.54 parts of the condensation product of 1 mol of quinizarine and 2 mols of 1-amino-4-methylbenzene which corresponds to the formula

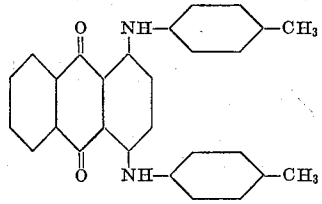

are dissolved at 10–15° in 130 parts of 96% sulphuric acid and 14 parts of N-methylol-2,4-dichlorobenzamide are added. The mixture is stirred for 24 hours at 10–15° whereupon it is poured onto ice and the precipitated condensation product is filtered off, washed neutral and dried. On sulphonating this product in 10% oleum for 24 hours at 10–15°, a dyestuff which is mainly disulphonated is obtained. It corresponds to the formula

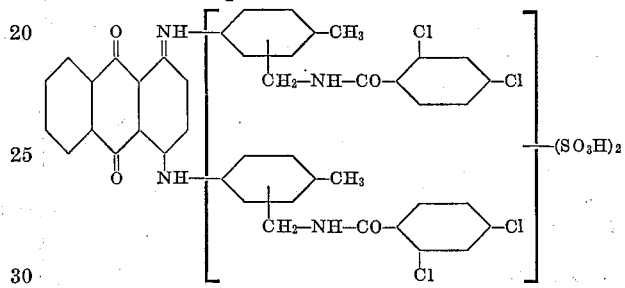

and consists of a mixture of all the isomers falling under the above formula. It dyes wool green from a weakly acid bath and the dyeings are wet-fast.

If, under otherwise the same conditions, the number of parts of the dye bases given in the following Table 2 are used instead of 12.54 parts of the above condensation product, then dyestuffs are obtained which have similar good properties.

TABLE 2

| Ex. No. | Parts | Dye base | Shade on wool |
|---|---|---|---|
| 11 | 14.9 | | Green. |
| 12 | 14.6 | | Do. |
| 13 | 13.00 | | Do. |
| 14 | 13.5 | | Yellowish green. |

EXAMPLE 15

12.54 parts of the dye base of the formula

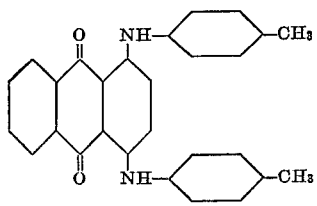

are dissolved at 10–15° in 130 parts of 96% sulphuric acid and 11.25 parts of N-methylol-2,4-dimethylbenzamide are added. The mixture is stirred for 24 hours at 10–15° whereupon it is poured onto ice and the precipitated condensation product is filtered off, washed neutral and dried. On sulphonating the reaction product in 10% oleum for 24 hours at 10–15°, a dyestuff consisting of a mixture of all isomers falling under the formula

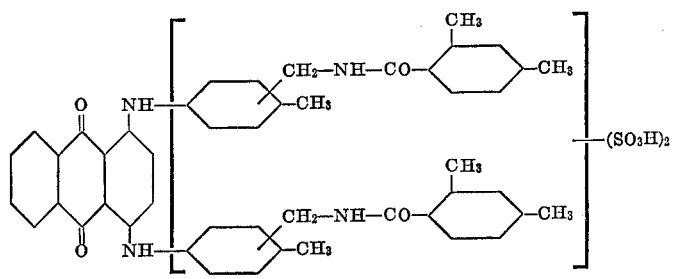

is obtained which dyes wool a wet-fast green shade from a weakly acid bath.

If, under otherwise the same conditions, instead of N-methylol-2,4-dimethylbenzamide, 11.25 parts of N-methylol-3,4-dimethylbenzamide or 12.4 parts of N-methylol-4- or -2-nitrobenzamide or 14.3 parts of N-methylol-diphenyl carboxylic acid amide (obtained by reacting diphenyl carboxylic acid amide with formaldehyde in an alkaline, aqueous/alcoholic solution), or if 12.2 parts of N-methylol-o-bromobenzamide or 16.5 parts of N-methylol-2,4-dibromobenzamide are used, then dyestuffs having similar good properties are obtained.

EXAMPLE 16

12.75 parts of the dye base of the formula

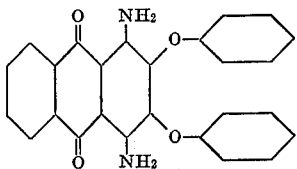

mixed with 14 parts of N-methylol-2,4-dichlorobenzamide are added at 0–5° to 140 parts of 90% sulphuric acid whereupon the mixture is stirred for 24 hours at 5°. The solution is poured onto ice and the precipitate of the product is filtered off, washed neutral and dried. On sulphonating the condensation product in 10% oleum for 24 hours at 13–15°, a dyestuff which consists of a mixture of all isomers falling under the formula

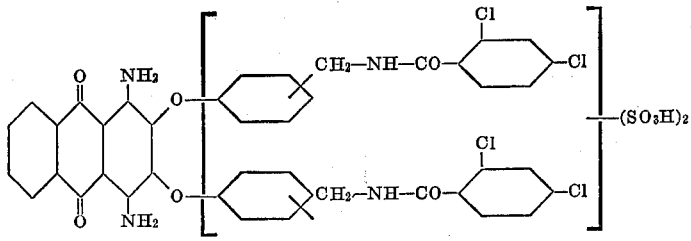

is obtained.

It produces wet-fast, red-violet wool dyeings from a weakly acid bath.

If, under otherwise the same conditions, 16.1 parts of the dye base of the formula

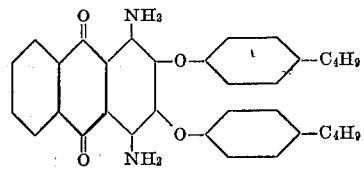

or 16.9 parts of the dye base of the formula

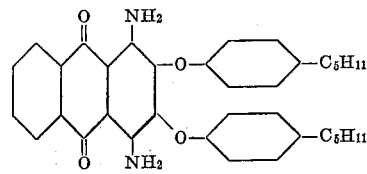

are used instead of the dye base mentioned above, then dyestuffs are obtained which also dye wool a fast red violet shade from a weakly acid bath.

Dyestuffs having similar properties are also obtained if, instead of N-methylol-2,4-dichlorobenzamide, 13 parts of N-methylol-4-tert. butylbenzamide or 9.5 parts of N-methylol-benzamide are used.

8.26 parts of the unsulphonated condensation product first mentioned above are dissolved at 8–10° in 100 parts of 96% sulphuric acid whereupon 1.8 parts of bromine are added and the whole is stirred at the same temperature for 16 hours.

The mixture is poured onto ice and the precipitate of the product is filtered off, washed neutral and dried. On sulphonating the bromine-containing condensation product in 20% oleum at 15–18° for 8 hours, a dyestuff is obtained which also dyes wool a red violet shade from a weakly acid bath. Compared with the dyestuff not containing bromine, it has a better drawing power from a neutral medium.

Dyestuffs having similar properties are also obtained if 15.2 parts of N-methylol-o-bromobenzamide or 20.5 parts of N-methylol-2,4-dibromobenzamide are used instead of N-methylol-2,4-dichlorobenzamide.

EXAMPLE 17

13.50 parts of the dye base of the formula

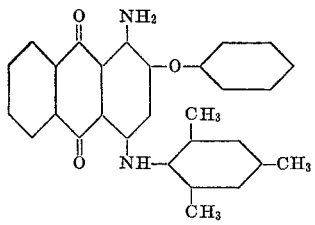

mixed with 14 parts of N-methylol-2,4-dichlorobenzamide are added at 0-2° to 150 parts of 90% sulphuric acid whereupon the mixture is stirred for 24 hours at 2°. The solution is poured onto ice and the precipitate of the product is filtered off, washed neutral and dried. On sulphonating the condensation product with 10% oleum for 30 minutes at 45°, a dyestuff consisting of a mixture of all isomers falling under the formula

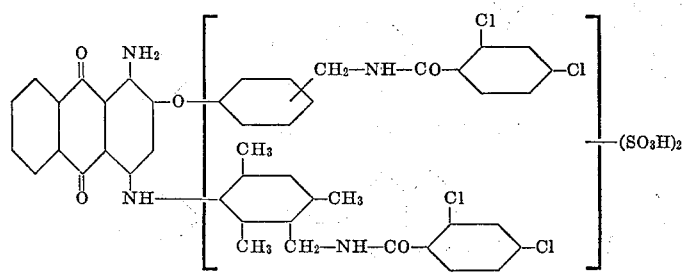

is obtained which dyes wool a blue violet shade from a weakly acid bath. The dyeings are wet-fast.

If, with otherwise the same procedure, 13.1 parts of the dye base of the formula

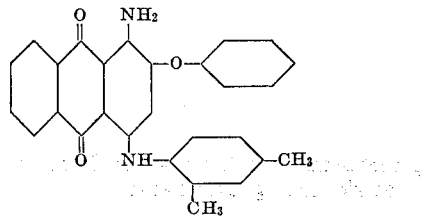

are used instead of the dye base mentioned above, then a dyestuff which dyes wool fast in a reddish blue shade is obtained.

Dyestuffs having similar properties are also obtained if, instead of N-methylol-2,4-dichlorobenzamide, 11.7 parts of N-methylol-2-chlorobenzamide or 9.5 parts of N-methylol-benzamide, or equivalent amounts of N-methylol-o-bromobenzamide or N-methylol-2,4-dibromo-benzamide or N-methylol-4-tert.butyl-benzamide or N-methylol-4-nitro-benzamide are used.

EXAMPLE 18

15.60 parts of the dye base of the formula

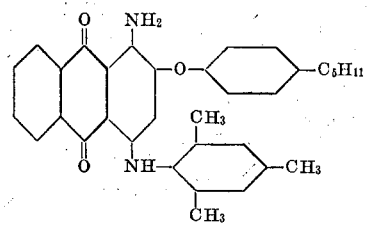

mixed with 7 parts of N-methylol-2,4-dichlorobenzamide are added at 0-5° to 170 parts of 90% sulphuric acid. The mixture is stirred for 24 hours at 5° whereupon the solution is poured onto ice, the precipitated product is filtered off, washed neutral and dried. On sulphonating the condensation product in 10% oleum for 30 minutes at 45°, a dyestuff consisting of a mixture of all isomers falling under the formula

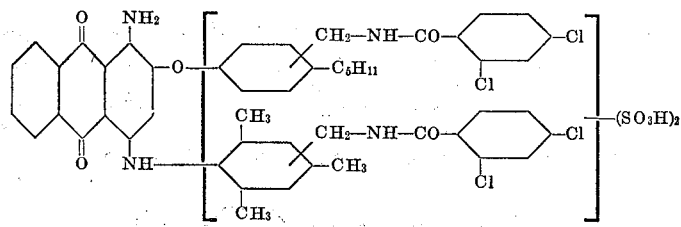

is obtained which dyes wool a blue violet shade from a weakly acid bath. The dying is wet-fast.

If, under otherwise the same conditions, 5.8 parts of N-methylol-2-chlorobenzamide or 4.75 parts of N-methylol-benzamide or 9.5 parts of N-methylol-benzamide or equivalent amounts of N-methylol-o-bromo-benzamide or N-methylol-2,4-dibromo-benzamide or N-methylol-4-tert.butyl-benzamide or N-methylol-4-nitro-benzamide are used, then dyestuffs having similar properties are obtained.

EXAMPLE 19

10 g. of woolen flannel are immersed at 40° in a dyebath prepared from 500 ml. of water, 0.5 g. of sodium sulfate, 0.4 g. of acetic acid and 0.2 g. of the dyestuff of Example 3. The temperature of the bath is gradually raised within 30 minutes to the boiling point and the bath then kept at the boil for one hour. The dyed woolen fabric is withdrawn from the bath, rinsed with water, and dried at room temperature. There is obtained a very level, brilliant reddish-blue dyeing.

I claim:
1. A dyestuff of the formula

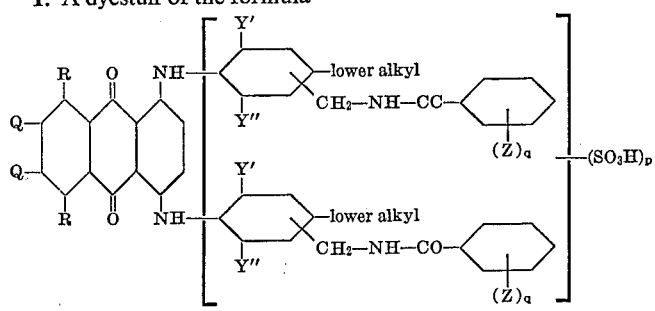

wherein
R represents hydrogen or hydroxyl,
Q represents hydrogen, chlorine or bromine,
Z represents hydrogen, lower alkyl, chlorine, bromine or nitro,
$q$ is an integer ranging from 1 to 2,
Y' represents hydrogen or lower alkyl,
Y'' represents hydrogen, lower alkyl, chlorine or bromine, and
$p$ represents 0 or 2, the —$SO_3H$ groups present being bonded to ring carbon atoms.

2. A dystuff as defined in claim 1, wherein $p$ represents 0.

3. A dyestuff as defined in claim 1, wherein $p$ represents 2.

4. A dyestuff as defined in claim 3, wherein R represents hydrogen and Q represents hydrogen or chlorine.

5. A dyestuff as defined in claim 4, wherein each of lower alkyl and Y' represents methyl, and Y'' represents methyl, bromine or chlorine.

6. A dyestuff as defined in claim 4, which is of the formula

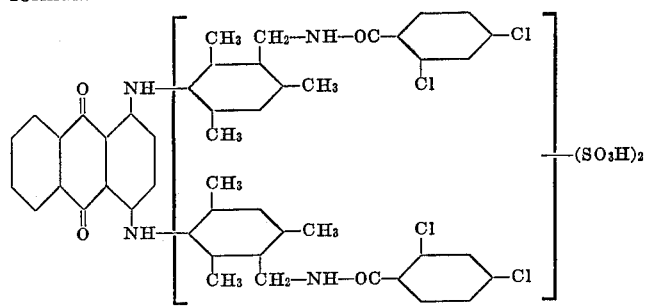

7. A dyestuff as defined in claim 4, which is of the formula

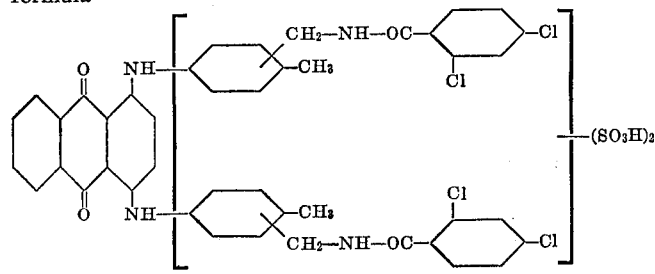

8. A dyestuff as defined in claim 4, which is of the formula

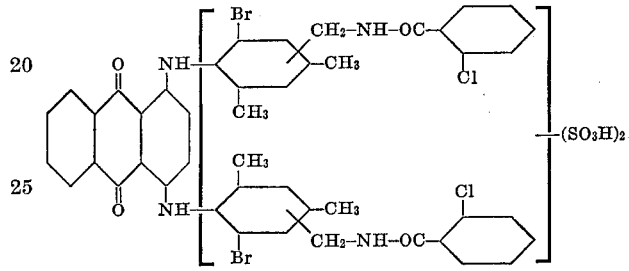

9. A dyestuff of the formula

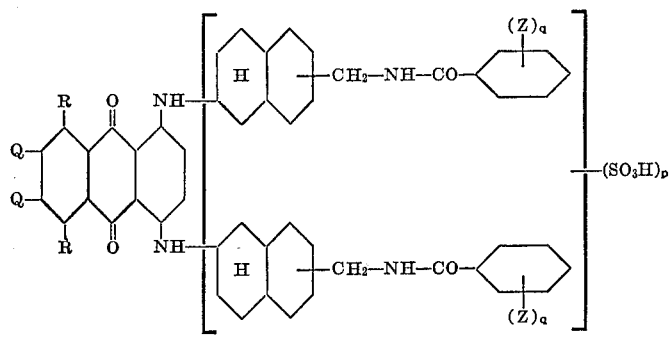

wherein
R represents hydrogen or hydroxyl,
Q represents hydrogen, chlorine or bromine,
Z represents hydrogen, lower alkyl, chlorine, bromine or nitro,
$q$ is an integer ranging from 1 to 2, and
$p$ represents 0 or 2, the —$SO_3H$ groups present being bonded to ring carbon atoms.

10. A dyestuff as defined in claim 9, wherein p represents 2.

11. A dyestuff as defined in claim 10, which is of the formula

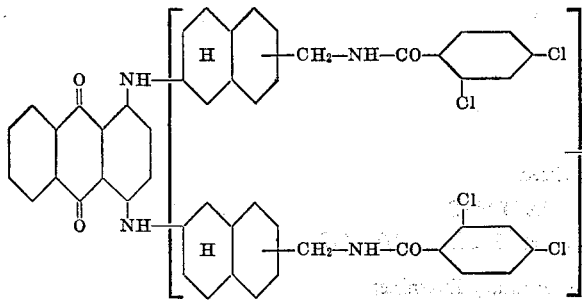

12. A dyestuff of the formula

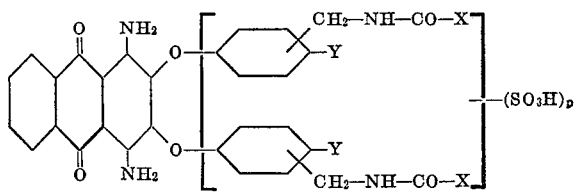

wherein

Y represents hydrogen or lower alkyl,
X represents unsubstituted phenyl or phenyl substituted by at most 3 substituents selected from the following: lower alkyl, bromine, chlorine or nitro, and
p represents 0 or 2, the —SO₃H groups present being bonded to ring carbon atoms.

13. A dyestuff as defined in claim 12, wherein p represents 2.

14. A dyestuff as defined in claim 13, wherein X represents phenyl.

15. A dyestuff as defined in claim 13, wherein X represents lower alkyl-phenyl, chloro-phenyl or bromophenyl.

16. A dyestuff as defined in claim 13, which is of the formula

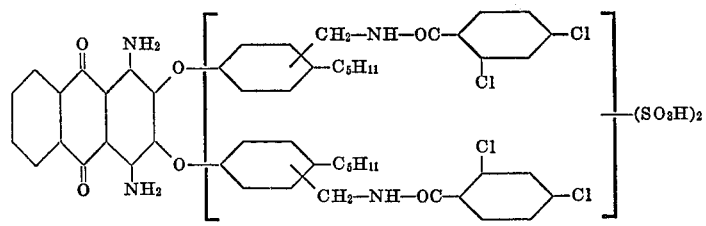

17. A dyestuff of the formula

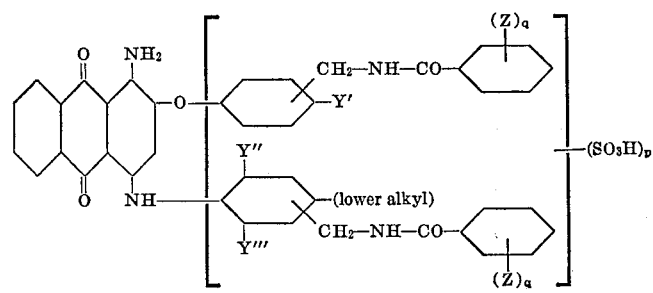

wherein

Y' represents hydrogen or lower alkyl,
Y" represents hydrogen, lower alkyl, chlorine or bromine,
Y'" represents hydrogen or lower alkyl,
Z represents hydrogen, lower alkyl, chlorine, bromine or nitro,
q is an integer ranging from 1 to 2, and
p represents 0 or 2, the —SO₃H groups present being bonded to ring carbon atoms.

18. A dyestuff as defined in claim 17, wherein p represents 2.

19. A dyestuff as defined in claim 18, wherein Y" represents hydrogen or methyl, each of (lower alkyl) and Y'" represents methyl, and each

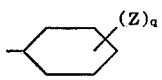

represents a grouping of the formula

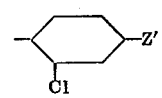

wherein Z' is hydrogen or chlorine.

20. A dyestuff as defined in claim 19, which is of the formula
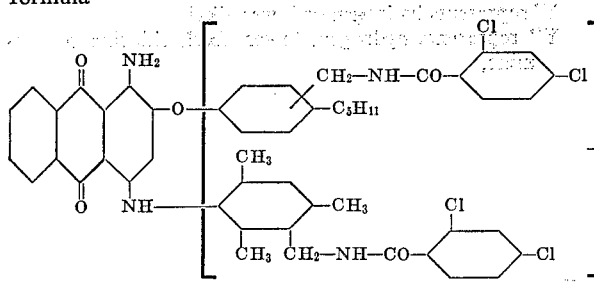
References Cited
UNITED STATES PATENTS
3,376,320  4/1968  Schwander et al. _____ 260—372
LORRAINE A. WEINBERGER, Primary Examiner
E. J. SKELLY, Assistant Examiner
U.S. Cl. X.R.
260—377; 8—39